(12) United States Patent
Yamakawa et al.

(10) Patent No.: US 10,334,114 B2
(45) Date of Patent: Jun. 25, 2019

(54) COLLECTIVE HOUSING/BUILDING ENTRANCE DEVICE AND ENTRYPHONE SYSTEM HAVING THAT COLLECTIVE HOUSING/BUILDING ENTRANCE DEVICE

(71) Applicant: AIPHONE CO., LTD., Nagoya-shi Aichi (JP)

(72) Inventors: Seiya Yamakawa, Nagoya (JP); Kenji Yasukawa, Nagoya (JP)

(73) Assignee: AIPHONE CO., LTD., Nagoya-Shi, Aichi (JP)

(*) Notice: Subject to any disclaimer, the term of this patent is extended or adjusted under 35 U.S.C. 154(b) by 0 days.

(21) Appl. No.: 15/763,805

(22) PCT Filed: Sep. 28, 2015

(86) PCT No.: PCT/JP2015/077374
§ 371 (c)(1),
(2) Date: Mar. 27, 2018

(87) PCT Pub. No.: WO2017/056165
PCT Pub. Date: Apr. 6, 2017

(65) Prior Publication Data
US 2018/0295242 A1 Oct. 11, 2018

(51) Int. Cl.
*H04M 1/60* (2006.01)
*H04M 9/00* (2006.01)
(Continued)

(52) U.S. Cl.
CPC ....... *H04M 11/025* (2013.01); *H04M 1/0291* (2013.01); *H04M 1/274508* (2013.01);
(Continued)

(58) Field of Classification Search
CPC .. H04M 11/025; H04M 2250/22; H04M 1/66; H04M 1/665; H04M 1/723; H04M 3/42314; H04M 9/02
(Continued)

(56) References Cited

U.S. PATENT DOCUMENTS

| 4,578,540 A * | 3/1986 | Borg ........................ H04M 1/66 379/101.01 |
| 4,851,811 A | 7/1989 | Vallat et al. |

(Continued)

FOREIGN PATENT DOCUMENTS

| DE | 102012100564 A1 | 7/2013 |
| JP | S63-106098 A | 5/1988 |

(Continued)

OTHER PUBLICATIONS

International Search Report and Written Opinion for related PCT Application No. PCT/JP2015/077374, dated Dec. 15, 2015; English translation provided (15 pages).

(Continued)

*Primary Examiner* — Binh Kien Tieu
(74) *Attorney, Agent, or Firm* — Procopio, Cory, Hargreaves & Savitch LLP

(57) ABSTRACT

An intercom system according to the invention is configured to be communicable with dwelling unit devices installed in individual dwelling units, and includes: an input section (11) which can input, in order for a visitor to call a resident, dwelling-unit specifying information that specifies the dwelling unit device of the resident on a character-by-character basis and can call the specified dwelling unit device; a name display section (13) which displays a name that is allocated to at least one of the individual dwelling unit devices; and a dedicated call section (14) which is provided (Continued)

correlated with the name display section (13) and can call the dwelling unit device to which the name is allocated.

8 Claims, 7 Drawing Sheets

(51) Int. Cl.
*H04M 11/02* (2006.01)
*H04M 9/02* (2006.01)
*H04M 1/02* (2006.01)
*H04M 1/2745* (2006.01)
*H04M 1/56* (2006.01)
*H04M 1/64* (2006.01)
*H04M 19/04* (2006.01)

(52) U.S. Cl.
CPC ............... *H04M 1/56* (2013.01); *H04M 1/64* (2013.01); *H04M 9/00* (2013.01); *H04M 9/02* (2013.01); *H04M 19/041* (2013.01)

(58) Field of Classification Search
USPC ............ 379/167.01, 167.02, 167.05, 167.06, 379/167.08, 167.12, 167.14, 167.15, 171, 379/172, 167.03, 167.04
See application file for complete search history.

(56) References Cited

U.S. PATENT DOCUMENTS

| | | | |
|---|---|---|---|
| 7,783,018 | B1 | 8/2010 | Goldberg |
| 2003/0185367 | A1 | 10/2003 | Shinozaki et al. |
| 2007/0247277 | A1* | 10/2007 | Murchison ......... G07C 9/00087 340/5.2 |
| 2011/0007883 | A1* | 1/2011 | Bingham ............. H04M 11/025 379/93.17 |
| 2016/0196705 | A1* | 7/2016 | Tehranchi ........... G07C 9/00111 340/5.61 |

FOREIGN PATENT DOCUMENTS

| | | | | |
|---|---|---|---|---|
| JP | H03-066255 A | | 3/1991 | |
| JP | 05336249 A | * | 12/1993 | ............. H04M 9/00 |
| JP | H05-336249 A | | 12/1993 | |
| JP | 2003-289390 A | | 10/2003 | |
| JP | 2005-295279 A | | 10/2005 | |
| JP | 2005295279 A | * | 10/2005 | ............. H04M 9/00 |
| JP | 2011-205570 A | | 10/2011 | |

OTHER PUBLICATIONS

Extended European Search Report for related EP App No. 15905320.6 dated Apr. 9, 2019, 9 pgs.

* cited by examiner

Fig.2
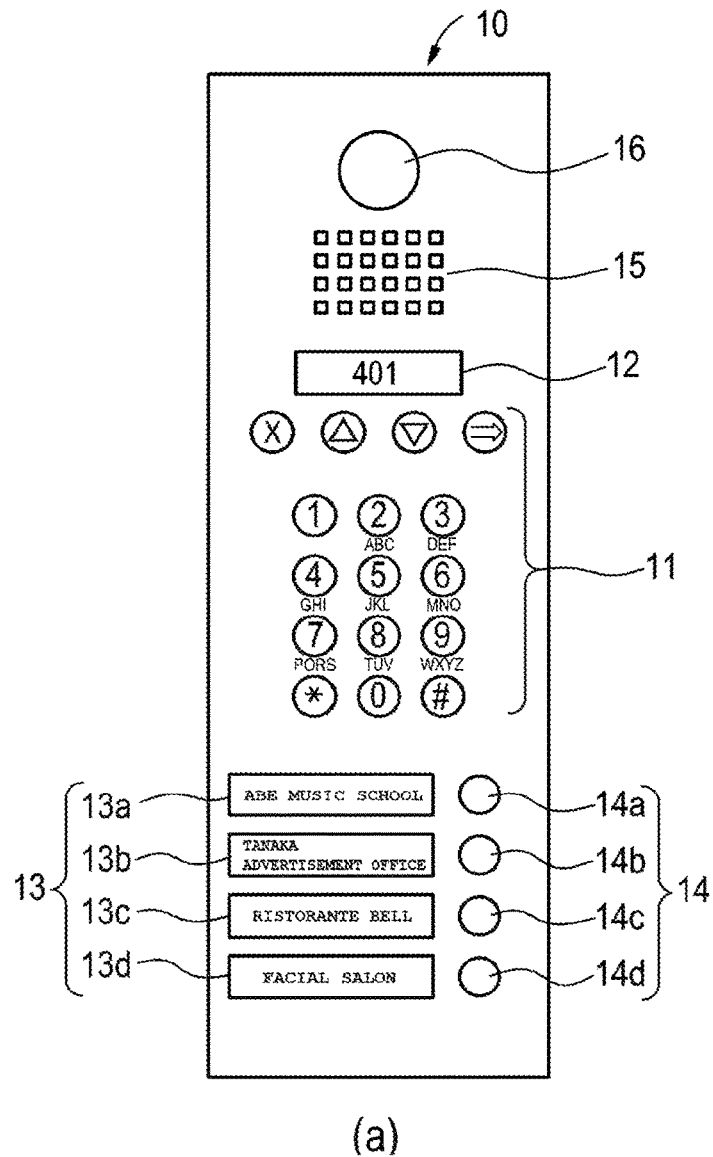
(a)
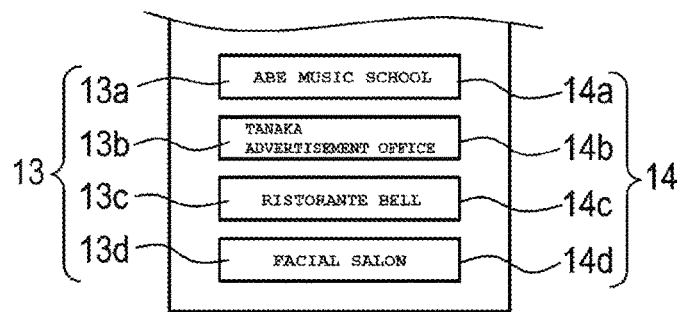
(b)

Fig.4

RESIDENT NAME TABLE

| DWELLING UNIT DEVICE ID | DWELLING UNIT NO. | RESIDENT NAME |
|---|---|---|
| LR101 | 101 | アベ(ABE) |
| LR102 | 102 | JONES |
| LR103 | 103 | スズキ(SUZUKI) |
| LR104 | 104 | タナカ(TANAKA) |
| ⋮ | ⋮ | ⋮ |
| LR201 | 201 | Harry |
| LR202 | 202 | ムラカミ(MURAKAMI) |
| LR203 | 203 | ベルナルド(BERNARD) |
| LR204 | 204 | ホソダ(HOSODA) |
| ⋮ | ⋮ | ⋮ |
| LR501 | 501 | ミレイ(MIREI) |
| LR502 | 502 | キクチ(KIKUTI) |
| LR503 | 503 | Lily |
| LR504 | 504 | サイトウ(SAITO) |
| ⋮ | ⋮ | ⋮ |

(a)

TENANT NAME TABLE

| NAME DISPLAY SECTION ID | TENANT NAME | BUSINESS HOURS | DWELLING UNIT DEVICE ID |
|---|---|---|---|
| DWELLING 1 | ABE MUSIC SCHOOL | 10:00～17:00 | LR101 |
| DWELLING 2 | TANAKA ADVERTISEMENT OFFICE | 9:00～18:00 | LR104 |
| DWELLING 3 | RISTORANTE BELL | 11:00～21:00 | LR203 |
| DWELLING 4 | FACIAL SALON | 12:00～18:00 | LR501 |

CALL TABLE

| DWELLING UNIT DEVICE ID | DWELLING UNIT NO. | RESIDENT NAME | TENANT NAME | BUSINESS HOURS OF TENANT |
|---|---|---|---|---|
| LR101 | 101 | アベ(ABE) | ABE MUSIC SCHOOL | 10:00〜17:00 |
| LR102 | 102 | JONES | | |
| LR103 | 103 | スズキ(SUZUKI) | | |
| LR104 | 104 | タナカ(TANAKA) | TANAKA ADVERTISEMENT OFFICE | 9:00〜18:00 |
| ⋮ | ⋮ | ⋮ | ⋮ | |
| LR201 | 201 | Harry | | |
| LR202 | 202 | ムラカミ(MURAKAMI) | | |
| LR203 | 203 | ベルナルド(BERNARD) | RISTORANTE BELL | 11:00〜21:00 |
| LR204 | 204 | ホソダ(HOSODA) | | |
| ⋮ | ⋮ | ⋮ | ⋮ | |
| LR501 | 501 | ミレイ(MIREI) | FACIAL SALON | 12:00〜18:00 |
| LR502 | 502 | キクチ(KIKUTI) | | |
| LR503 | 503 | Lily | | |
| LR504 | 504 | サイトウ(SAITO) | | |
| ⋮ | ⋮ | ⋮ | ⋮ | |

Fig.7
(a) 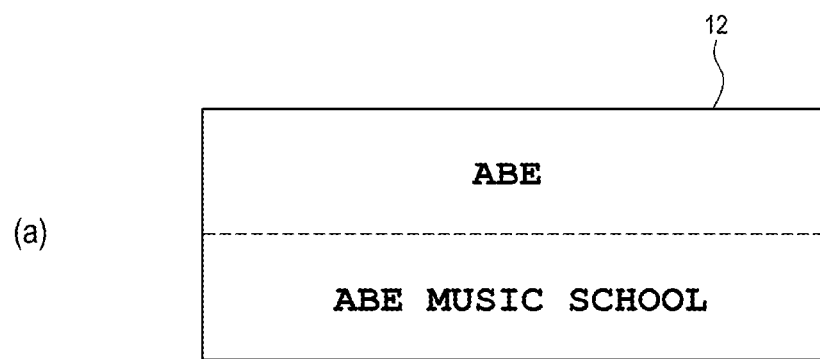
(b) 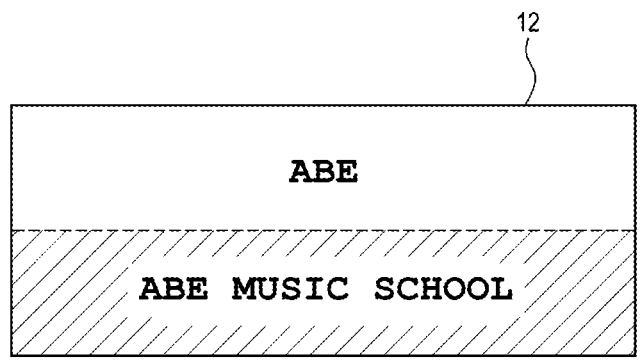

COLLECTIVE HOUSING/BUILDING ENTRANCE DEVICE AND ENTRYPHONE SYSTEM HAVING THAT COLLECTIVE HOUSING/BUILDING ENTRANCE DEVICE

CROSS-REFERENCE TO RELATED APPLICATIONS

This application is a U.S. National Stage entry of PCT Application No: PCT/JP2015/077374 filed Sep. 28, 2015, the contents of which are incorporated herein by reference.

TECHNICAL FIELD

The present invention relates to a communal entrance device and an intercom system equipped with the communal entrance device.

BACKGROUND ART

It is often the case that a communal entrance device and an automatic door are installed in the communal entrance of a collective housing such as an apartment building, from the viewpoint of improving security. A visitor operates the numeric keypad of the communal entrance device to input a dwelling unit number of a destination to visit, thereby calling a resident (dwelling unit device) as the destination to visit. Then, the visitor asks the resident to unlock the automatic door and thus can enter the collective housing (see Patent Document 1).

PRIOR ART DOCUMENT

Patent Document

Patent Document 1: JP-A-2011-205570

SUMMARY OF INVENTION

Problems to be Solved by Invention

In recent years, not only a supermarket or a convenience store but also an independent shop or office or the like sometimes occupies a collective housing such as an apartment building. However, a visitor who visits such an independent shop or office or the like for the first time knows the name of the shop or office to visit, but sometimes does not know the dwelling unit number to visit. In this case, the visitor may have a hard time calling the destination to visit.

Accordingly, the present invention has for its object to provide a communal entrance device and an intercom system equipped with the communal entrance device which can improve convenience when a visitor calls a destination to visit.

Means for Solving Problems

In order to attain the aforesaid object, a communal entrance device according to the invention is configured to be communicable with dwelling unit devices installed in individual dwelling units. The communal entrance device includes: an input section which can input dwelling-unit specifying information that specifies the dwelling unit device of a resident, on a character-by-character basis, in order for a visitor to call the resident, and can call the specified dwelling unit device; a name display section which displays a name that is allocated to at least one of the individual dwelling unit devices; and a dedicated call section which is provided correlated with the name display section and can call the dwelling unit device to which the name is allocated.

According to this configuration, even when a visitor does not know dwelling-unit specifying information (a dwelling unit number, a resident name or the like) of a destination to visit, the visitor can call the destination to visit by confirming a name of the name display section installed in the communal entrance device and operating the dedicated call section provided correlated with the name display section. In contrast, a visitor who knows dwelling-unit specifying information (a dwelling unit number, a resident name or the like) of a destination to visit can call the dwelling unit device of the destination to visit by operating the input section to input the dwelling-unit specifying information. In this manner, according to this configuration, as two kinds of call functions are provided, convenience when a visitor calls a destination to visit can be improved.

The communal entrance device according to the invention may further include a display section which displays contents inputted by the input section.

According to this configuration, a visitor can perform a call operation while confirming the inputted dwelling-unit specifying information on the display section.

The communal entrance device according to the invention may be such that the name display section and the dedicated call section are integrally formed.

According to this configuration, a visitor can operate the dedicated call section of a destination to visit without pushing the wrong part. Further, an area necessary for installing the operation portion can be reduced.

An intercom system according to the invention includes the communal entrance device.

According to this configuration, the call function using the dwelling-unit specifying information (the dwelling unit number, the resident name or the like) and the call function using the name are provided. Thus, convenience when a visitor calls a destination to visit can be improved.

The intercom system according to the invention may further include a dwelling unit device which is installed in a dwelling unit, wherein the dwelling unit device may be configured to output annunciation sounds which differ between in the case where the dwelling unit device is called by operating the input section and in the case where the dwelling unit device is called by operating the dedicated call section.

According to this configuration, a resident can predict what brings a visitor to the resident, based on the annunciation sound outputted from the dwelling unit device.

The intercom system according to the invention may further include a real-time clock which generates time information; and a controller which changes a display mode of at least one of the name display section or the dedicated call section based on the time information.

According to this configuration, the controller can display, based on the time information, for example, the display mode of the name display section or dedicated call section when outside business hours in such a way as to be distinguishable from the display mode when in business.

A communal entrance device according to another aspect of the invention is configured to be communicable with dwelling unit devices installed in individual dwelling units. The communal entrance device includes: an input section which can input dwelling-unit specifying information that specifies the dwelling unit device of a resident, on a character-by-character basis, in order for a visitor to call the resident, and can call the specified dwelling unit device; a record section which records a call table that includes resident names allocated to the individual dwelling unit devices and a name allocated to at least one of the individual dwelling unit devices; and a controller which specifies the dwelling unit device to be called, based on the dwelling-unit specifying information inputted by the input section and the call table, and performs a call control for calling the specified dwelling unit device.

According to this configuration, a visitor can perform both a call using a resident name and a call using, for example, a tenant name by operating the input section. Thus, convenience of a visitor who performs a call operation is improved. Further, for example, even when a user who utilizes a dwelling unit as a SOHO (Small Office/Home Office) increases and so a person who desires to register the tenant name in the communal entrance device increases, such an increase can be responded by updating the call table. In other words, this configuration can respond to an increased demand for a SOHO without enlarging the communal entrance device.

The communal entrance device according to the invention may further include a display section which displays contents inputted by the input section; and a real-time clock which generates time information, wherein predetermined business hours can be set, in the call table, for each dwelling unit device to which the name is allocated, and a display mode of the name which is displayed on the display section when within business hours differs from a display mode of the name which is displayed on the display section when outside business hours.

According to this configuration, a visitor can be clearly informed in advance that the visitor has come when outside business hours. Thus, for example, the dwelling unit device of a tenant which is outside business hours can be prevented from being called. In contrast, when a tenant as a callee is in business, a visitor can be informed clearly that the tenant is in business.

The intercom system according to the invention may be configured in such a way that when the dwelling unit device outside business hours is called, a message informing that the dwelling unit device is outside business hours is annunciated.

According to this configuration, a visitor can be further clearly informed that the visitor has come when outside business hours.

The intercom system according to the invention may include the communal entrance device.

According to this configuration, both a call using a resident name and a call using, for example, a tenant name can be performed by operating the input section. Thus, convenience when a visitor calls a destination to visit can be improved.

Advantageous Effects of Invention

According to the communal entrance device and the intercom system provided with the communal entrance device of the invention, convenience when a visitor calls a destination to visit can be improved.

BRIEF DESCRIPTION OF DRAWINGS

FIGS. 2(a)-(b) each illustrate a configuration diagram of a communal entrance device according to the embodiment of the invention and illustrate a modified example of an operation portion.

FIGS. 4(a)-(b) each illustrate a data table which is used when performing a call using a numeric keypad and illustrates a data table which is used when performing a call using a dedicated keypad.

FIG. 6 is a diagram illustrating a call table.

FIGS. 7(a)-(b) each provide a diagram illustrating an example of a display mode when during business hours and is a diagram illustrating an example of a display mode when outside business hours.

EMBODIMENTS OF INVENTION

Hereinafter, embodiments will be explained in detail with reference to drawings.

First Embodiment

Figure 1:
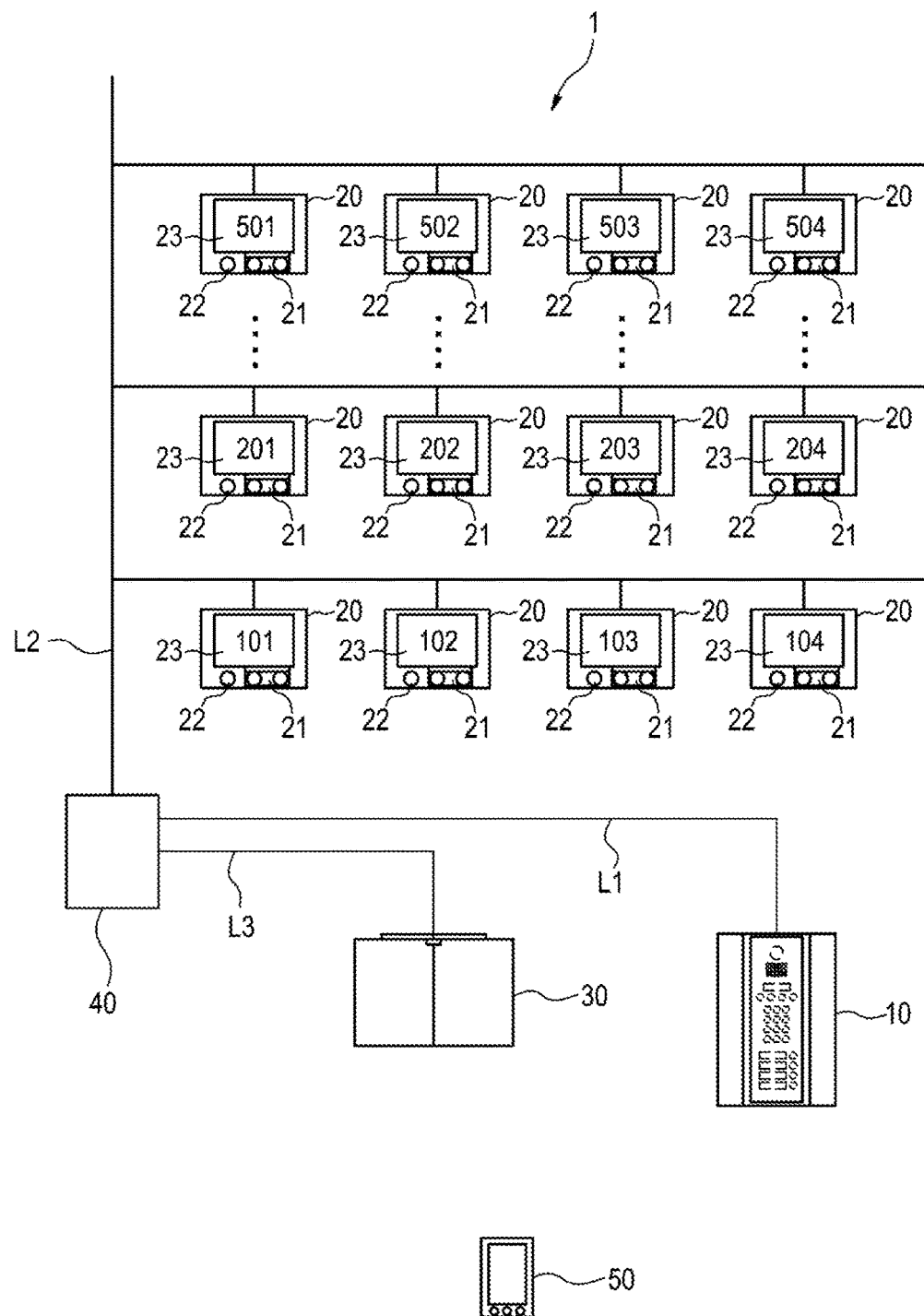
FIG. 1 is a configuration diagram of an intercom system according to a first embodiment of the invention.

As illustrated in FIG. 1, an intercom system 1 includes a communal entrance device 10, dwelling unit devices 20, a communal entrance door 30, a controller 40 and external terminals 50. The intercom system 1 is a system applicable to a collective housing such as an apartment building which is occupied by a tenant represented by, for example, a SOHO (Small Office/Home Office). In this specification, the "tenant" is used as a term which collectively represents an independent or small-scale-management business unit such as a private office, an independent restaurant, or an independent beauty salon, regardless of whether or not a resident of the tenant is a lessee.

The communal entrance device 10 is installed in a communal entrance as a common space of a collective housing. The communal entrance device 10 has a function of calling a resident of each dwelling unit, a function of capturing an image of a visitor with a camera, and the like. The communal entrance device 10 is communicably connected to the controller 40 via a signal line L1.

The dwelling unit devices 20 are installed in the respective dwelling units of the collective housing. The dwelling unit device 20 includes a speech section 21 for speaking with a visitor when there is a call from the visitor using the communal entrance device 10, an unlock button 22 for unlocking the communal entrance door 30, and a display 23 for displaying an image of a visitor. The speech section 21 includes a microphone and a speaker. The speech section 21 has an annunciation function of annunciating a call from the communal entrance device 10 by producing a sound. The dwelling unit device 20 is communicably connected to the controller 40 via a signal line L2.

The communal entrance door 30 is provided at the communal entrance of the collective housing and is configured of an automatic door which has a function of restricting entrance into the dwelling area. The communal entrance door 30 is communicably connected to the controller 40 via a signal line L3.

The controller 40 controls the communication and speech between the communal entrance device 10, the dwelling unit device 20, and the external terminals 50 and electrically controls locking/unlocking of the communal entrance door 30.

The external terminal 50 is a terminal, such as a smartphone, a tablet, a mobile phone, or a personal computer, possessed by a resident or the like of the collective housing, which enables information communication. The external terminal 50 is installed with, for example, application software for updating information of residents which is stored in the communal entrance device 10 is installed. The external terminal 50 can communicate with the communal entrance device 10 via a communication network such as the internet.

As illustrated in (a) of FIG. 2, the communal entrance device 10 includes an input section 11, a display section 12, a name display section 13, a dedicated call section 14, a speech section 15, and a camera 16.

The input section 11 is a portion which is operated in order for a visitor present in the communal entrance to call a resident of a particular dwelling unit and is configured of plural kinds of operation buttons (for example, a numeric keypad, a switch button and a call button). The numeric keypad is configured so as to be able to input not only numerals but also, for example, hiragana, katakana, alphabet by a switching operation. A visitor can input dwelling-unit specifying information (for example, a dwelling unit number, a resident name) which specifies the dwelling unit device 20 of the dwelling unit to visit, on a character-by-character basis, via the input section 11.

The display section 12 displays characters of the dwelling-unit specifying information that are inputted via the input section 11. The display section 12 is formed of, for example, a liquid crystal display or an organic EL (electroluminescence) display.

The name display section 13 is a portion which displays the names or the like of tenants allocated in advance to apart of the dwelling unit devices 20. In order to display the name or the like of the tenant, the resident is required to secure the name display section 13 by contacting with the manager of the collective housing. The name or the like of the tenant to be displayed is submitted in advance by the contracted resident. In place of the name or the like of an independent shop or office as shown in the name display sections 13a to 13d, for example, a logo or a trademark thereof may be displayed. Alternatively, a dwelling unit No. and a resident name or the like may be displayed as, for example, "dwelling unit No. 202: Murakami". In this embodiment, a configuration is such that the names of tenants of the name display sections 13a to 13d are allocated to the dwelling unit devices 20 of four dwelling units. The name display sections 13 are each formed of, for example, a liquid crystal display or an organic EL display. The names of these tenants are each displayed electronically. The name display may be configured in such a way that plates describing the names of the tenants are attached to the name display sections 13a to 13d.

The dedicated call section 14 is a portion which is used for a visitor present in the communal entrance to call a tenant of a particular dwelling unit and, for example, is configured of push-operable dedicated call buttons 14a to 14d. The dedicated call buttons 14a to 14d are provided correlated with the name display sections 13a to 13d, respectively. For example, when calling "Abe Music School" displayed on the name display section 13a, the dedicated call button 14a correlated with the name display section 13a is configured to be pushed down. The other dedicated call buttons 14b to 14d are also configured in the similar manner. The dedicated call button 14b is configured to be pushed down when calling "Tanaka Advertisement Office" displayed on the name display section 13b. The dedicated call button 14c is configured to be pushed down when calling "Ristorante Bell" displayed on the name display section 13c. The dedicated call button 14d is configured to be pushed down when calling "Facial Salon" displayed on the name display section 13d.

As illustrated in (b) of FIG. 2, the name display sections 13a to 13d and the dedicated call sections 14b to 14d may be formed integrally, respectively.

The speech section 15 transmits and receives a voice signal for establishing a speech between a visitor and a particular resident as a callee. The speech section 15 is configured of, for example, a microphone and a speaker.

The camera 16 captures an image of a visitor who has performed a call operation via the input section 11 or the dedicated call section 14 and generates an image signal. The camera 16 can be configured of one of various kinds of cameras using, for example, CCDs (charge coupled devices) or CMOSs (complementary metal oxide semiconductors).

Figure 3:
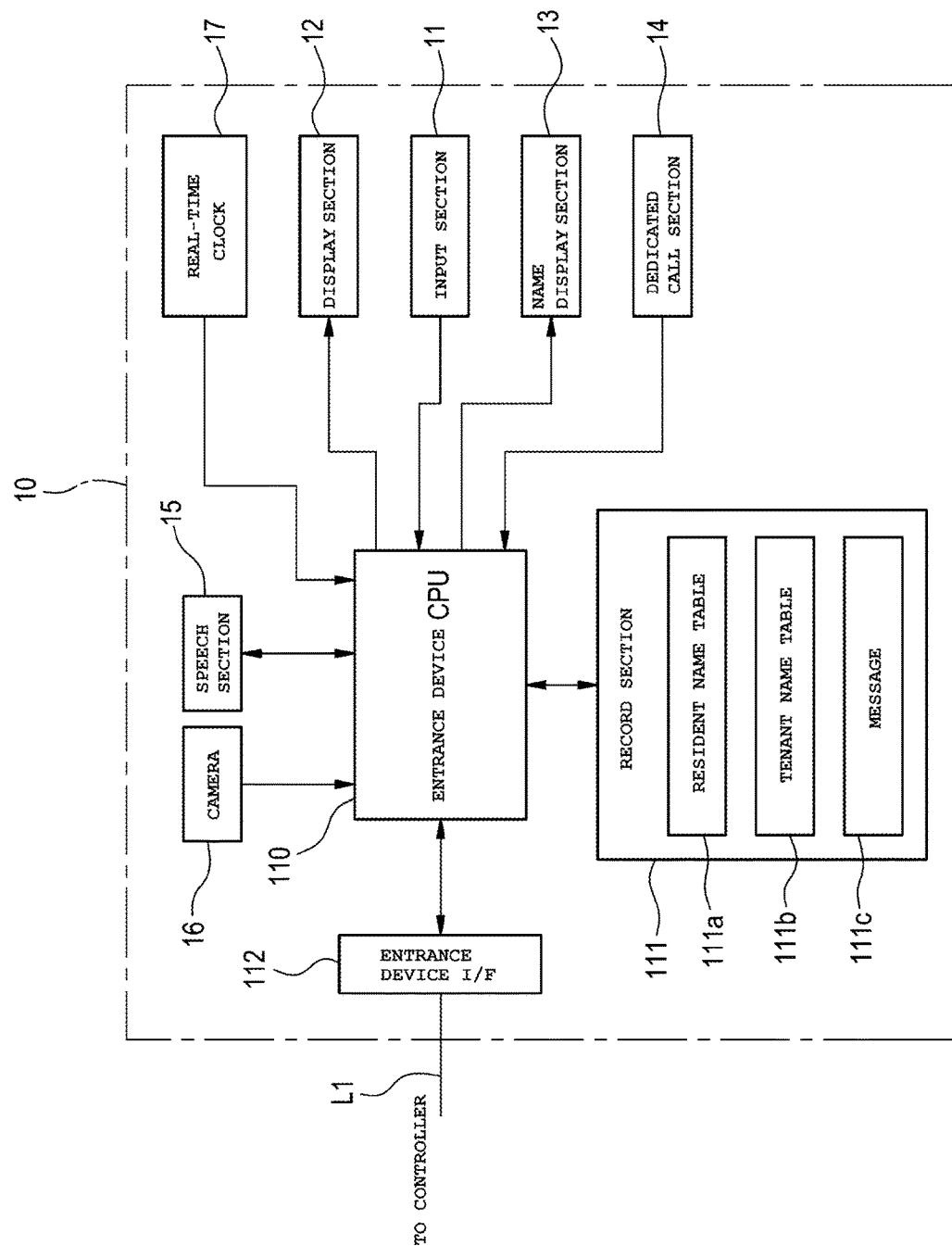
FIG. 3 is a functional block diagram of the communal entrance device.

As illustrated in a functional block diagram of FIG. 3, the communal entrance device 10 includes an entrance device CPU 110, the input section 11 connected to the entrance device CPU, the display section 12, the name display section 13, the dedicated call section 14, the speech section 15, the camera 16, a record section 111, an entrance device interface (hereinafter referred to as an entrance device I/F) 112, a real-time clock 17, and the like.

The entrance device CPU 110 controls operations of the individual sections constituting the communal entrance device 10. For example, the entrance device CPU specifies the dwelling unit device 20 having been called based on characters of the dwelling-unit specifying information which have been inputted from the input section 11, thereby performing the connection control between the specified dwelling unit device 20 and the communal entrance device 10. Alternatively, the entrance device CPU specifies the dwelling unit device 20 having been called based on one of the dedicated call buttons 14a to 14d which has been pushed down in the dedicated call section 14, thereby performing the connection control between the specified dwelling unit device 20 and the communal entrance device 10. Further, the entrance device CPU performs updating processing in such a way that a new resident name and a tenant name which are transmitted based on an operation from the outside or the like is recorded in the record section 111.

The record section 111 stores a resident name table 111a, a tenant name table 111b, and a message part 111c. In the resident name table 111a, the numbers of individual dwelling units of the collective housing and names of residents who live in the respective dwelling units are recorded correlated with the dwelling unit device IDs of the dwelling unit devices 20 installed in the individual dwelling units (see (a) in FIG. 4). In the tenant name table 111b, name display section IDs (Dwelling 1 to Dwelling 4) imparted to the respective name display sections 13a to 13d, tenant names ("Abe Music School" to "Facial Salon") displayed on the respective name display sections 13a to 13d, and business hours of the individual tenants are recorded correlated with the dwelling unit device IDs (see (b) in FIG. 4). The message part 111c stores a voice message or a character message which, when a tenant outside business hours is called, informs that the tenant is outside business hours.

The tenant names recorded correlated with the individual name display section IDs of the tenant name table 111b can be updated. A configuration is such that tenant names can be updated based on, for example, an operation of a touch panel on the display 23 of the dwelling unit device 20, an operation of a touch panel of the external terminal 50, or an operation of the numeric keypad or the like of the input section 11. In this embodiment, although the number of the name display section IDs is four, that is, Dwelling 1 to Dwelling 4 as illustrated in (b) of FIG. 4, this number can be increased by the resident contacting with the manager.

The business hours (also including a date and a day of the week) of each of the tenants can also be suitably set and updated in the similar manner.

The entrance device I/F 112 constitutes a communication section which forms a signal transmission path to the controller 40.

The real-time clock 17, for example, generates time information including date information and transmits the time information to the entrance device CPU 110.

Next, an operation of the intercom system 1 will be explained.

<Operation Pattern A>

Explanation will be made as to the case where a visitor who found "Abe Music School" on the internet reaches the collective housing depending on the address thereof and makes a call from the communal entrance device 10. It is supposed, however, that the visitor does not know the dwelling unit number of Abe Music School.

The visitor looks at the name display section 13 of the communal entrance device 10 to confirm the display of "Abe Music School" and pushes the dedicated call button 14a for calling "Abe Music School".

When the dedicated call button 14a is pushed, the entrance device CPU 110 specifies, with reference to the tenant name table 111b, the name display section ID of the name display section 13a on which "Abe Music School" is displayed and the dwelling unit device ID correlated with this name display section ID. The camera 16 of the communal entrance device 10 is activated to capture an image of the visitor. The entrance device CPU 110 transmits to the controller 40 a dedicated call signal representing that a call using the dedicated call button has been made. In this case, the entrance device CPU 110 transmits the dedicated call signal with the specified dwelling unit device ID (LR101) and the image signal of the visitor attached thereto.

When the controller 40 receives the dedicated call signal, the controller detects the attached dwelling unit device ID to discriminate a callee, and transmits the dedicated call signal, to which the dwelling unit device ID and the image signal are attached, to the dwelling unit device 20 of the dwelling unit No. 101 as the callee. The controller 40 may also be provided with data tables corresponding to the resident name table 111a and tenant name table 111b of the communal entrance device 10.

When the dwelling unit device 20 of the dwelling unit No. 101 receives the dedicated call signal, this dwelling unit device outputs, from the speaker of the speech section 21, an annunciation sound which annunciates the call from the visitor. The dwelling unit device 20 displays the image of the visitor on the display 23.

An employee of Abe Music School looks at the image and, if necessary, speaks with the visitor, and then unlocks the communal entrance door 30 using the unlock button 22.

<Operation Pattern B>

Explanation will be made as to the case where a visitor who is an acquaintance of Mr. Abe living in the dwelling unit No. 101 of the collective housing makes a call using the communal entrance device 10. It is supposed, however, that the visitor does not know the dwelling unit number of Mr. Abe.

The visitor operates the numeric keypad or the like of the input section 11 to input, for example, the dwelling unit number "101" of Mr. Abe. Alternatively, the character input from the input section 11 may be performed such that "Abe" is inputted in Japanese katakana or "ABE" is inputted in alphabet. The inputted characters are displayed on the display section 12. The visitor confirms the input and then pushes a call button.

When the call button is pushed, the entrance device CPU 110 specifies, with reference to the resident name table 111a, the dwelling-unit device ID correlated with "101" which is the inputted dwelling-unit specifying information. The camera 16 of the communal entrance device 10 is activated to capture an image of the visitor. The entrance device CPU 110 transmits to the controller 40 a normal call signal representing that a call using the numeric keypad or the like of the input section 11 has been made. In this case, the entrance device CPU 110 transmits the normal call signal with the specified dwelling unit device ID (LR101) and visitor's image signal attached thereto.

The controller 40 which has received the normal call signal detects the attached dwelling unit device ID to discriminate a callee, and transmits the normal call signal, to which the dwelling unit device ID and the image signal are attached, to the dwelling unit device 20 of the dwelling unit No. 101 as the callee.

The dwelling unit device 20 of the dwelling unit No. 101 which has received the normal call signal outputs, from the speaker of the speech section 21, an annunciation sound which annunciates the call from the visitor. The annunciation sound outputted when receiving the normal call signal differs in tone from the annunciation sound outputted when receiving the dedicated call signal. The dwelling unit device 20 displays the image of the visitor on the display 23.

The resident (Mr. Abe) of the dwelling unit No. 101 looks at the image and, if necessary, speaks with the visitor, and then unlocks the communal entrance door 30 using the unlock button 22.

According to the communal entrance device 10 and intercom system 1 of the embodiment described above, even when a visitor memorizes only the name of a destination to visit, for example, "Abe Music School" and visits the collective housing, the visitor can call Abe Music School as the destination to visit by confirming the tenant name displayed on the name display section 13 of the communal entrance device 10 and pushing the dedicated call button 14a provided correlated with Abe Music School. In this case, the visitor can smoothly call the destination to visit even without knowing the dwelling unit number occupied by or the resident name submitted by Abe Music School. In contrast, for example, when an acquaintance of Mr. Abe who knows the dwelling unit number (dwelling unit No. 101) where Mr. Abe lives, the acquaintance can smoothly call the destination to visit by inputting the dwelling unit number "101" or the resident name "ABE" from the input section 11 of the communal entrance device 10.

The characters inputted from the input section 11 are, for example, liquid-crystal-displayed on the display section 12, and thus a visitor can smoothly perform a call operation while confirming the inputted dwelling-unit specifying information.

In the case of a configuration wherein the name display section 13 and the dedicated call section 14 are integrally formed, such as a configuration wherein the tenant name is displayed on the dedicated call button, a visitor can smoothly perform the operation. In this case, the area of the communal entrance device 10 occupied by the operation portion can be further reduced.

In this manner, convenience when a visitor calls a destination to visit can be improved by providing two kinds of call functions using the input section 11 and the dedicated call section 14.

It is sometimes the case that dwelling unit numbers are not desired to be laid open to an advertisement from the viewpoint of security. In this embodiment, the operation using the tenant name displayed on the name display section 13 can be performed for each tenant, while the operation using the dwelling unit number inputted via the input section 11 can be performed for each dwelling unit. This is preferable for the residents.

A configuration is such that the annunciation sound outputted from the dwelling unit device 20 differs between in the case where the dwelling unit device is called by the operation on the input section 11 and in the case where the dwelling unit device is called by the operation on the dedicated call section 14. Thus, the resident can predict what brings a visitor to the resident, based on the annunciation sound outputted from the dwelling unit device 20.

Not only is the call using the input section 11 enabled, but the call using the dedicated call sections 14 is also enabled by proving the dedicated call sections 14 by the number corresponding to the needs of the residents. Consequently, for example, as compared with the communal entrance device which is configured to be provided with the name display section and the dedicated call section for each of all the dwelling units, the area of the communal entrance device occupied by the operation portion can be reduced to a large extent.

When the name displayed on the name display section 13 changes, the description on this name display section 13 of the communal entrance device 10 can be updated via the touch panel of the dwelling unit device 20, the touch panel of the external terminal 50, the input section 11 of the communal entrance device 10, or the like.

The name, logo, trademark or the like of an independent shop can be displayed on the communal entrance device 10, and thus a proprietor can attain a great advertising effect.

An illumination section may be provided at at least one of the name display section 13 or the dedicated call section 14. When the entrance device CPU 110 determines that a called tenant is outside business hours by comparing time information generated from the real-time clock 17 with business hours of the tenant stored in the tenant name table 111b, the entrance device CPU may turn the illumination section off. By turning the illumination section off when outside business hours, a visitor can be clearly informed in advance that the tenant is outside business hours. Thus, the dwelling unit device of a tenant can be prevented from being called when outside business hours. In contrast, by turning the illumination section on when within business hours, a visitor can be clearly informed that the tenant is in business.

When the dedicated call section 14 is operated outside business hours, the entrance device CPU 111 may, by using the data of the message part 111c, annunciate a voice message informing that the tenant is outside business hours from the speaker of the speech section 15. Alternatively, a character message informing that the tenant is outside business hours may be displayed on the display section 12. With this configuration, a visitor can be further clearly annunciated that the tenant is outside business hours.

Second Embodiment

Next, a second embodiment according to the invention will be explained. Constituent elements common to those of the first embodiment are referred to by the same symbols, with explanation thereof being omitted.

Figure 5:
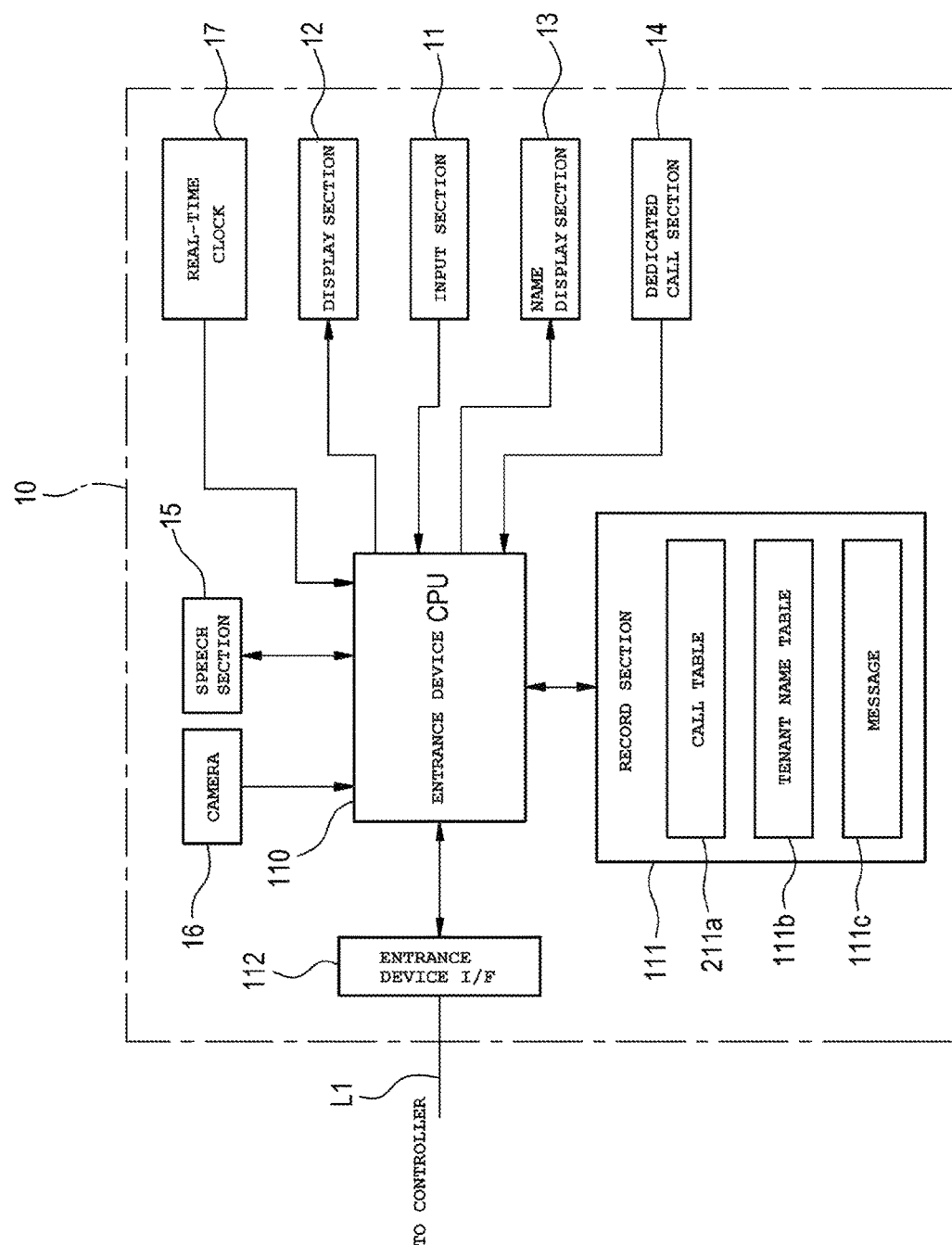
FIG. 5 is a functional block diagram of a communal entrance device according to a second embodiment.

As illustrated in FIG. 5, the record section 111 stores a call table 211a, the tenant name table 111b, and the message part 111c. As illustrated in FIG. 6, in the call table 211a, the individual dwelling unit numbers of the collective housing and names of residents who live in the respective dwelling units are recorded correlated with the dwelling unit device IDs of the dwelling unit devices 20 that are installed in the individual dwelling units. In the call table 211a, tenant names ("Abe Music School" to "Facial Salon") and business hours of the individual tenants are recorded correlated with the dwelling unit device IDs of the dwelling unit devices 20 that are installed in the individual dwelling units.

<Operation Pattern C>

As in the operation pattern A, explanation will be made as to the case where a visitor who found "Abe Music School" on the internet reaches the collective housing depending on the address thereof and makes a call from the communal entrance device 10. It is supposed, however, that the visitor does not know the dwelling unit number of Abe Music School.

The visitor operates the numeric keypad or the like of the input section 11 to input, for example, "A" of "ABE". Then, the entrance device CPU 110 displays, with reference to the call table 211a, the resident name and the tenant name the initials of which are "A" on the display section 12. In this case, when "Abe Music School" is during business hours, "ABE" and "Abe Music School" are displayed in the same display mode (backgrounds of these display sections have common brightness, or the like) (see (a) in FIG. 7).

In contrast, when "Abe Music School" is outside business hours, "ABE" and "Abe Music School" are displayed in different display modes (background of Abe Music School is displayed in gray, or the like) (see (b) in FIG. 7).

In this manner, the display mode of the tenant name is displayed on the display section 12 in such a way as to be distinguishable between when during business hours and when outside business hours. Thus, the dwelling unit device of a tenant can be prevented from being called when outside business hours.

According to the embodiment, both a calling using a resident name and a calling using a tenant name can be performed by the input to the input section 11. Thus, convenience for a visitor who performs a call operation can be improved.

For example, even when a user who utilizes the dwelling unit as a SOHO (Small Office/Home Office) increases and so a person who desires to register the tenant name in the communal entrance device increases, such an increase can be responded by updating the call table. In other words, this embodiment can respond to increased demand for a SOHO without enlarging the communal entrance device.

Incidentally, the invention is not limited to the embodiments described above, and can be suitably, for example, freely modified or improved. In addition, the material, shape, size, numerical value, mode, number, arrangement position, etc. of each of the constituent elements in the aforesaid embodiments are not particularly limited and may be set optionally so long as the invention can be achieved.

DESCRIPTION OF REFERENCE NUMERALS

1: intercom system
10: communal entrance device
11: input section
12: display section 13, 13a to 13d: name display section
14: dedicated call section
14a to 14d: dedicated call button
15: speech section
16: camera
20: dwelling unit device
30: communal entrance door
40: controller
50: external terminal
111a: resident name table
111b: tenant name table

The invention claimed is:

1. A communal entrance device which is configured to be communicable with dwelling unit devices installed in individual dwelling units, the communal entrance device comprising:
an input section which can input dwelling-unit specifying information that specifies the dwelling unit device of a resident, on a character-by-character basis, and can call the specified dwelling unit device;
a name display section which displays a name that is allocated to at least one of the individual dwelling unit devices;
a dedicated call section which is provided correlated with the name display section and can call the dwelling unit device to which the name is allocated; and
a real-time clock which generates time information, wherein a display mode of at least one of the name display section or the dedicated call section is changed based on the time information in response to a signal received from a controller.

2. The communal entrance device according to claim 1, further comprising:
a display section which displays contents inputted by the input section.

3. The communal entrance device according to claim 1, wherein the name display section and the dedicated call section are integrally formed.

4. An intercom system comprising the communal entrance device according to claim 1.

5. The intercom system according to claim 4, further comprising:
a dwelling unit device which is installed in a dwelling unit, wherein
the dwelling unit device outputs annunciation sounds which differ between in the case where the dwelling unit device is called by operating the input section and in the case where the dwelling unit device is called by operating the dedicated call section.

6. A communal entrance device which is configured to be communicable with dwelling unit devices installed in individual dwelling units, the communal entrance device comprising:
an input section which can input dwelling-unit specifying information that specifies the dwelling unit device of a resident, on a character-by-character basis, and can call the specified dwelling unit device;
a record section which records a call table that includes resident names allocated to the individual dwelling unit devices and a name allocated to at least one of the individual dwelling unit devices;
a controller which specifies the dwelling unit device to be called, based on the dwelling-unit specifying information inputted by the input section and the call table, and performs a call control for calling the specified dwelling unit device;
a display section which displays contents inputted by the input section; and
a real-time clock which generates time information, wherein predetermined business hours can be set, in the call table, for each dwelling unit device to which the name is allocated, and wherein a display mode of the name which is displayed on the display section when within the business hours differs from a display mode of the name which is displayed on the display section when outside the business hours in response to a signal received from a controller.

7. The communal entrance device according to claim 6, wherein when the dwelling unit device outside the business hours is called, a message informing that the dwelling unit device is outside the business hours is annunciated.

8. An intercom system comprising the communal entrance device according to claim 6.

* * * * *